C. H. WEBSTER.
FOOT REST FOR SHOVELS, SPADES, &c.
APPLICATION FILED MAY 3, 1912.
1,042,180.
Patented Oct. 22, 1912.
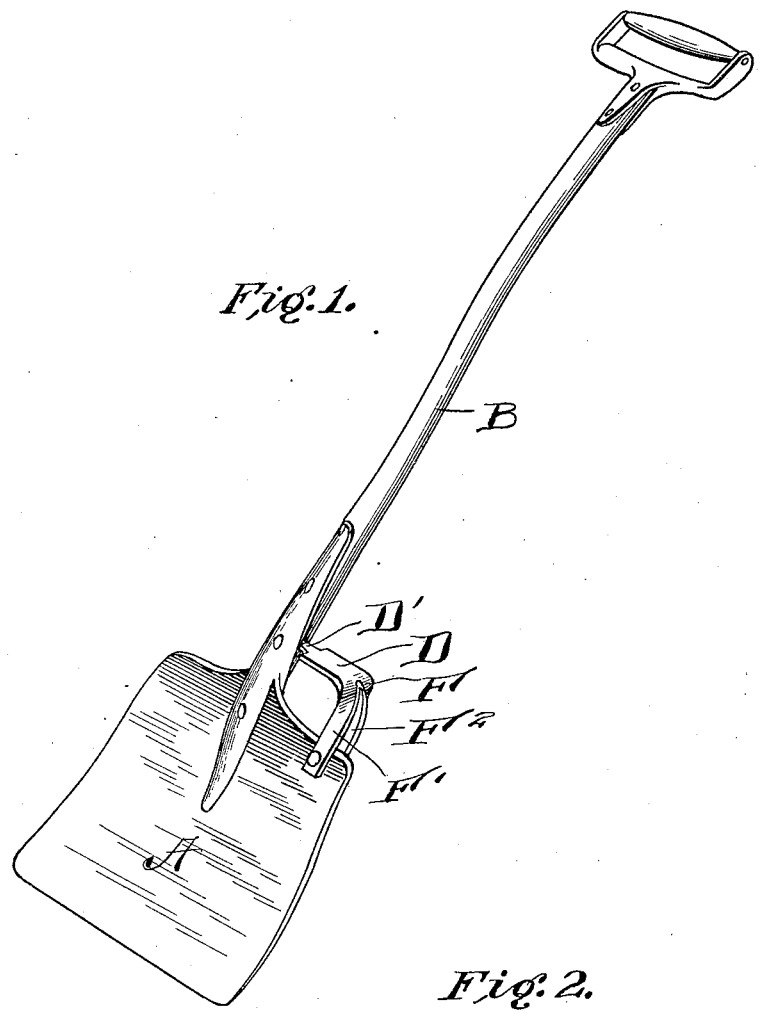
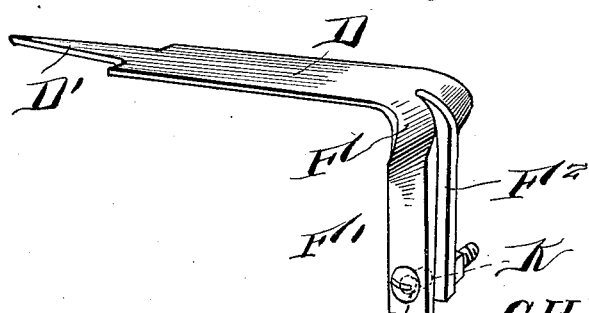

UNITED STATES PATENT OFFICE.

CHARLES H. WEBSTER, OF THOMASTON, MAINE.

FOOT-REST FOR SHOVELS, SPADES, &c.

1,042,180.    Specification of Letters Patent.    Patented Oct. 22, 1912.

Application filed May 3, 1912. Serial No. 694,954.

*To all whom it may concern:*

Be it known that I, CHARLES H. WEBSTER, a citizen of the United States, residing at Thomaston, in the county of Knox and State of Maine, have invented certain new and useful Improvements in Foot-Rests for Shovels, Spades, &c.; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in shovels and consists of a simple and efficient device adapted to be fastened jointly to the shovel and its handle and affording a foot rest whereby the shovel may be pushed into the soil.

The invention comprises various details of construction and combinations and arrangements of parts which will be hereinafter fully described, shown in the accompanying drawings and then specifically defined in the appended claim.

I illustrate my invention in the accompanying drawings, in which:—

Figure 1 is a perspective view showing the application of the invention to a shovel, and Fig. 2 is a detail view of the device removed.

Reference now being had to the details of the drawings by letter, A designates a shovel and B a handle.

My improved foot rest comprises a plate D, preferably flat and having a spur D' projecting from one end which is adapted to be driven into the handle at a location adjacent to the shovel. Said plate is bent at right angles at F and is split at its angle, forming two arms F' and F² which are bent into a plane at right angles to the plane of the plate which forms a foot rest and said arms are spaced apart. A bolt passes through registering apertures K in said arms. Said arms are adapted to engage opposite faces of the shovel and the bolt to pass through registering apertures in said arms and spade and, when the nut is applied to the threaded end of the bolt, the device will be securely held in place.

By the provision of a device embodying the features of my invention, it will be noted that a substantial surface is allowed as a foot rest upon which the foot of an operator is adapted to rest when it is desired to push the shovel into the ground.

What I claim to be new is:—

A foot rest for shovels comprising a plate pointed at one end and adapted to be attached to the handle of a shovel, said plate being bent at right angles and slotted, forming two arms, each of which is bent longitudinally at right angles to the shank portion and each apertured for the reception of a bolt for fastening the same to a shovel, as set forth.

In testimony whereof I hereunto affix my signature in the presence of two witnesses.

CHARLES H. WEBSTER.

Witnesses:
A. N. LINSCOTT,
W. J. JAMESON.

Copies of this patent may be obtained for five cents each, by addressing the "Commissioner of Patents, Washington, D. C."